US011437672B2

(12) United States Patent
Ruehle et al.

(10) Patent No.: US 11,437,672 B2
(45) Date of Patent: Sep. 6, 2022

(54) ELECTRICAL ENERGY STORE, DEVICE AND/OR VEHICLE AND METHOD FOR PRODUCING AN ELECTRICAL ENERGY STORE

(71) Applicant: Robert Bosch GmbH, Stuttgart (DE)

(72) Inventors: Andreas Ruehle, Bietigheim-Bissingen (DE); Boris Gendlin, Filderstadt (DE); Ionut Marian Lica, Schwieberdingen (DE); Matthias Oechsle, Ditzingen-Hirschlanden (DE); Thomas Dittert, Stuttgart (DE); Maximilian Russ-Mohl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 347 days.

(21) Appl. No.: 16/525,734

(22) Filed: Jul. 30, 2019

(65) Prior Publication Data
US 2020/0044201 A1 Feb. 6, 2020

(30) Foreign Application Priority Data

Jul. 31, 2018 (DE) ...................... 10 2018 212 710.7

(51) Int. Cl.
*H01M 50/10* (2021.01)
*H01M 50/20* (2021.01)

(52) U.S. Cl.
CPC ........... *H01M 50/10* (2021.01); *H01M 50/20* (2021.01); *H01M 2220/20* (2013.01)

(58) Field of Classification Search
None
See application file for complete search history.

(56) References Cited

U.S. PATENT DOCUMENTS

| 2012/0161677 | A1* | 6/2012 | Kunimitsu | ......... H01M 10/482 318/139 |
| 2013/0078485 | A1 | 3/2013 | Muis | |
| 2013/0207617 | A1* | 8/2013 | Houchin-Miller | ......................... H01M 10/613 320/150 |
| 2017/0077723 | A1 | 3/2017 | Wilka | |
| 2017/0077725 | A1 | 3/2017 | Wilka | |

FOREIGN PATENT DOCUMENTS

| EP | 3128575 | 2/2017 |
| EP | 3142165 | 3/2017 |
| EP | 3142172 | 3/2017 |

* cited by examiner

*Primary Examiner* — Carmen V Lyles-Irving
(74) *Attorney, Agent, or Firm* — Michael Best & Friedrich LLP

(57) ABSTRACT

Electrical energy store (1), device and/or vehicle and method for producing an electrical energy store (1) comprising a control unit (11) and electrical energy storage cells (2), each comprising a cell controller (31), wherein the control unit (11) comprises a printed circuit board which is cohesively connected to the respective cell controller (31) of each electrical energy storage cell (2).

15 Claims, 4 Drawing Sheets

ELECTRICAL ENERGY STORE, DEVICE AND/OR VEHICLE AND METHOD FOR PRODUCING AN ELECTRICAL ENERGY STORE

BACKGROUND OF THE INVENTION

The present invention relates to an electrical energy store, a device and/or a vehicle and a method for producing an electrical energy store.

EP 3 142 165 A1 discloses a battery system having overcharge and/or deep discharge protection. The battery system comprises a fast discharge unit and a trigger unit having an electrically conductive mechanical component for triggering the fast discharge unit.

EP 3 142 172 A1 discloses a battery system having overcharge and/or deep discharge protection. The battery system comprises a fast discharge unit for electrically discharging the electrical energy store having a first terminal, which is electrically connected to a first pole of a battery, and having a second terminal, which is electrically connected to the second pole of the battery, and a trigger unit for triggering the fast discharge unit.

EP 3 128 575 A1 discloses a rechargeable battery with a charging and discharging unit arranged above the battery.

SUMMARY OF THE INVENTION

The heart of the invention in the case of the electrical energy store comprising a control unit and electrical energy storage cells, each comprising a cell controller, consists in the fact that the control unit comprises a printed circuit board, which is cohesively connected to the respective cell controller of each electrical energy storage cell The background of the invention is that the electrical energy store is implementable in compact and lightweight fashion. The printed circuit board and printed circuit board parts of the cell controllers are cohesively connected, in particular wherein conductor tracks of the printed circuit board are electrically conductively interconnected with further conductor tracks of the printed circuit board parts.

Advantageously, the energy density of the electrical energy store is improved.

In accordance with one advantageous configuration, the printed circuit board comprises first cutouts and conductor tracks, wherein a respective conductor track is cohesively connected, in particular connected by welding, in particular connected by means of laser welding, to a respective contact pad of the cell controller through a first cutout. As a result, the conductor tracks are securely connectable to the contact pads. As a result of the use of laser welding, the energy input into the electrical energy storage cell is reducible in comparison with, for example, a soldering process. The printed circuit board is thus connectable to the cell controllers connected to the electrical energy storage cells without the electrical energy storage cells thereby attaining a temperature that is critical for them.

It is advantageous in this case if the printed circuit board comprises a controller circuit, which is connected to the cell controllers by means of the conductor tracks and the contact pads. The electrical energy store is thus implementable in compact fashion.

Furthermore, it is advantageous if the control unit comprises a housing part, wherein the housing part comprises third cutouts, wherein the third cutouts respectively cover the first cutouts. The housing part surrounds the control unit at least partly in a housing-forming manner. The production of a cohesive connection of the printed circuit board to the respective cell controllers is made possible through the respective third cutouts. The electrical energy store can thus firstly be assembled before the printed circuit board is cohesively connected to the respective cell controllers.

Advantageously, the third cutouts are closed by means of a transparent film, in particular a laser-transparent film. In this case, the film is transmissive to the laser beam used for the laser welding. Furthermore, the film closes the third cutouts in a fluid-tight manner.

In accordance with one advantageous configuration, the printed circuit board is connected to each electrical energy storage cell in a positively locking manner. As a result of the positively locking connection, the printed circuit board and the electrical energy storage cells are alignable relative to one another. Advantageously, the printed circuit board and the electrical energy storage cells are connected to one another firstly in a positively locking manner and then cohesively. As a result, a respective connection area between the printed circuit board and the respective electrical energy storage cell is positionable with high accuracy before the cohesive connection is produced.

In this case, it is advantageous if each electrical energy storage cell comprises at least one projection, which is led in each case through a respective second cutout in the printed circuit board. The printed circuit board and the respective electrical energy storage cell are thus alignable relative to one another in a simple manner by means of the projections and the second cutouts.

Furthermore, it is advantageous if the projections of the electrical energy storage cells are arranged in alignment, and wherein the second cutouts in the printed circuit board are arranged in alignment. As a result, the electrical energy storage cells are alignable relative to one another in a simple manner, in particular by means of a mounting aid.

In accordance with a further advantageous configuration, each electrical energy storage cell comprises a discharge device, which is drivable by means of the cell controller. It is advantageous in this case that the electrical energy storage cell in a critical operating state is dischargeable by means of the discharge device. A safe state of the electrical energy store is able to be established as a result. Advantageously, the electrical energy store is still usable after the electrical energy storage cell has been discharged.

The heart of the invention in the case of the device and/or the vehicle consists in the fact that the device and/or the vehicle comprise(s) at least one electrical energy store as described above or according to any of the claims related to the electrical energy store.

The background of the invention is that the electrical energy store is implementable in compact and lightweight fashion. As a result, the energy density of the electrical energy store is improved. The electrical energy store is implementable in smaller and/or lighter fashion. Consequently, the mass of the device and/or of the vehicle is reducible and/or the range of the vehicle is extendable.

The heart of the invention in the case of the method for producing an electrical energy store, in particular as described above or according to any of the claims related to the electrical energy store, is that the method comprises the following temporally successive method steps:

wherein in a first method step electrical energy storage cells of the electrical energy store are arranged alongside one another, wherein in a second method step the electrical energy storage cells are connected, in particular fixed, to one another, wherein in a third method step cell connectors are arranged on the electrical energy storage cells and are connected to cell terminals of the electrical energy storage cells, wherein in a fourth method step a control unit is aligned relative to the electrical energy storage cells and is connected to the electrical energy store, wherein in a fifth method step a controller circuit of the control unit is connected to the cell controllers in a signal-conducting and/or electrically conducting manner, in particular by means of laser welding.

The background of the invention is that the electrical energy stores are arranged, aligned and connected to one another and to the control unit before the controller circuit is connected to the cell controllers in a signal-conducting manner. A secure signal-conducting connection of the controller circuit to the cell controllers is thereby made possible since the component parts of the electrical energy store are fixed relative to one another. The controller circuit and the cell controllers can be connected in a signal-conducting manner at points.

Advantageously, laser welding is used for producing the signal-conducting connection, as a result of which the energy input into the electrical energy storage cell is reducible in comparison with, for example, a soldering process. The printed circuit board is thus connectable to the cell controllers connected to the electrical energy storage cells without the electrical energy storage cells thereby attaining a temperature that is critical for them.

In accordance with one advantageous configuration, in the first method step the electrical energy storage cells are arranged in such a way that the positive and negative electrical terminals of the respective energy storage cells are arranged alternately. It is advantageous in this case that, in the event of the electrical energy storage cells being connected in series, the cell connectors for connecting the positive and negative electrical terminals of adjacent electrical energy storage cells are implementable in compact fashion.

Advantageously, the electrical energy storage cells are aligned in such a way that projections on the electrical energy storage cells are oriented in alignment. As a result, the electrical energy storage cells are alignable relative to one another in a simple manner, in particular by means of a mounting aid.

The above configurations and developments can be combined with one another in any desired way, insofar as is practical. Further possible configurations, developments and implementations of the invention also encompass combinations not explicitly mentioned of features of the invention described above or below with regard to the exemplary embodiments. In particular, in this case, the person skilled in the art will also add individual aspects as improvements or supplementations to the respective basic form of the present invention.

BRIEF DESCRIPTION OF THE DRAWINGS

In the following section, the invention is explained on the basis of exemplary embodiments, from which further inventive features may be evident, but to which the scope of the invention is not restricted. The exemplary embodiments are illustrated in the drawings.

In the figures.

DETAILED DESCRIPTION

Figure 1:
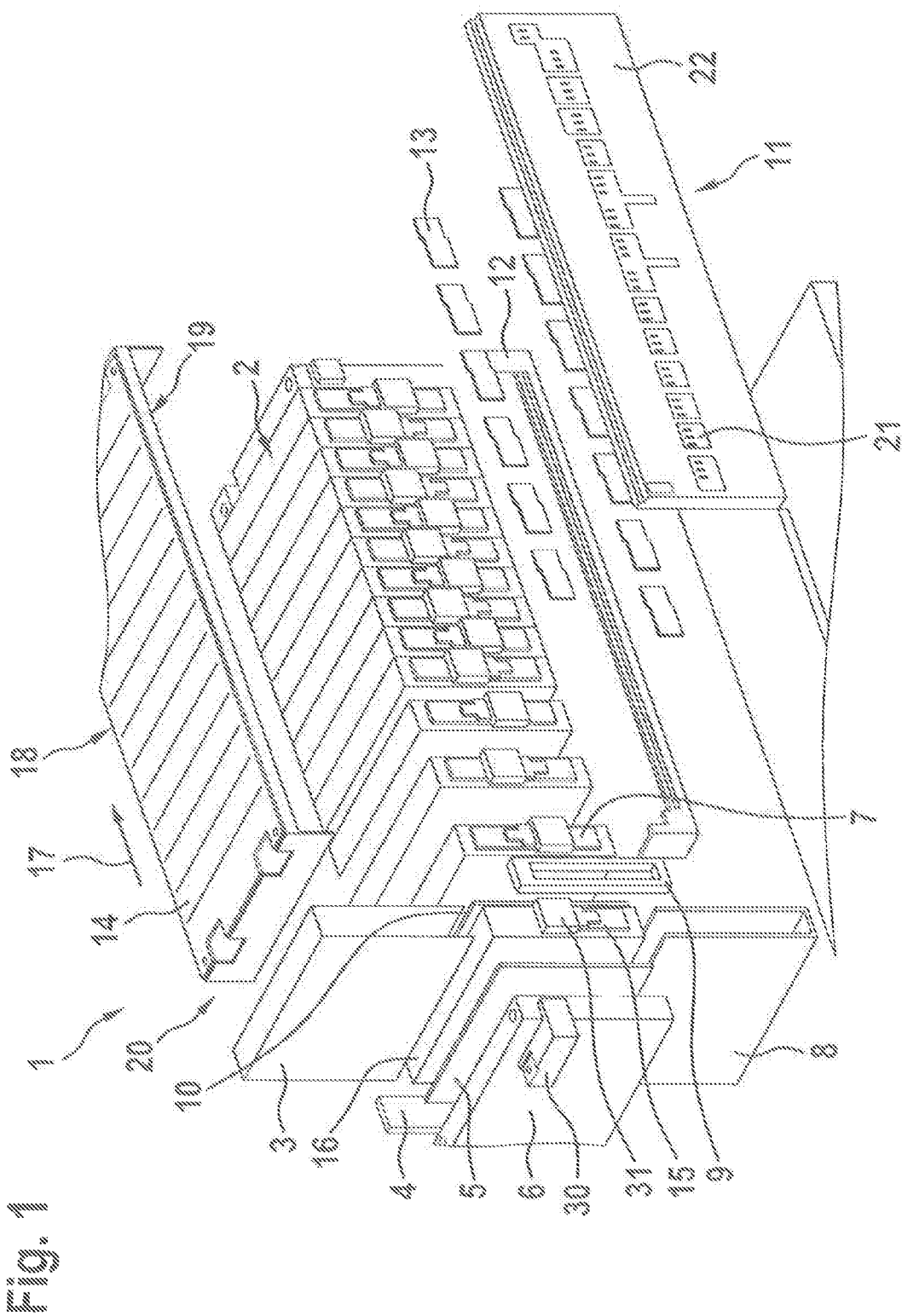
FIG. 1 shows an exploded illustration of an electrical energy store 1 according to the invention.

The electrical energy store 1 according to the invention as illustrated in FIG. 1 comprises:

at least two electrical energy storage cells 2, at least one cell connector 13 for electrically conductively connecting the electrical energy storage cells 2, a cover part 14, a holding means 12, a control unit 11 and a cooling device 6.

The electrical energy storage cells 2 are embodied in parallelepipedal fashion and each have six side faces. The electrical energy storage cells 2 are arranged in a stacked manner in the electrical energy store 1. In this case, two electrical energy storage cells 2 each touch one another by means of the largest side face of the respective electrical energy storage cell 2.

The electrical energy storage cells are held by means of the cover part 14 and the holding means 12. In this case, the cover part 14 and the holding means 12 extend along a stacking direction 17 of the electrical energy store 1. The cover part 14 and the holding means 12 are arranged opposite one another. The electrical energy storage cells 2 are arranged between the cover part 1 and the holding means 12, in particular in a manner braced by means of the cover part 14 and the holding means 12.

Preferably, the cover part 14 and/or the holding means 12 are/is embodied as a sheet-metal part, in particular as a stamped and bent part.

The cover part 14 comprises a covering section 18 and two first cover part side sections 20 and two second cover part side sections 19, wherein the first and second cover part side sections (19, 20) project from the covering section 18. Preferably, the first and respectively the second cover part side sections (20, 19) and the covering section 18 form an angle in each case, wherein the angle is between 60° and 120°, in particular wherein the angle is a right angle. The covering section 18 completely covers a side face of each electrical energy storage cell 2.

The first cover part side sections 20 are arranged opposite one another at the covering section 18. The first cover part side sections 20 cover a largest side face of an outer electrical energy storage cell 2 of the electrical energy store 1 in each case partly, preferably to the extent of 20% to 50%.

The second cover part side sections 19 are arranged opposite one another at the covering section 18. The second cover part side sections 19 cover a further side face of each electrical energy storage cell 2 of the electrical energy store 1 in each case partly, preferably to the extent of 5% to 20%.

The holding means 12 extends along the further side faces of the electrical energy storage cells 2 and covers the further side faces of the electrical energy storage cells 2 in each case partly, preferably to the extent of 5% to 20%.

At least one cooling device 6 is arranged adjacent to the electrical energy storage cells 2; preferably, a respective cooling device 6 is arranged in the stacking direction 17 alongside a respective outer electrical energy storage cell 2 of the electrical energy store 1. Preferably, the cooling device 6 is embodied as a fan.

The electrical energy storage cells 2 are electrically conductively connectable to one another by means of the cell connectors 13. For this purpose, the cell connectors 13 are arranged at the further side faces of the electrical energy storage cells 2.

The control unit 11 is arranged at least partly in a housing part 22. The control unit 11 extends along the further side faces of the electrical energy storage cells 2. The cell connectors 13 are arranged between the control unit 11 and the electrical energy storage cells 2.

The electrical energy storage cell 2 comprises:
- a housing 16, in which electrodes, a separator and an electrolyte of the electrical energy storage cell 2 are arranged,
- a discharge device 15,
- a cell controller 31, comprising a discharge controller,
- a safety valve,
- at least one cell terminal 7 for contacting the electrodes, and
- an insulating system, comprising a first insulating means 3, a second insulating means 8, a third insulating means 5, a fourth insulating means 10, a fifth insulating means 4 and a sixth insulating means 9.

The housing 16 is embodied as a metal housing and surrounds the electrodes, the separator and the electrolyte in a housing-forming manner. The cell terminal 7 and the cell controller 31 are arranged at a third side face of the housing 16.

Preferably, the housing 16 is electrically conductively connected to an electrode of the electrical energy storage cell 2 and functions as a further cell terminal.

The housing 16 is completely surrounded by the insulating system, the cell terminal 7, the cell controller 31 and the discharge device 15. The first insulating means 3 and the second insulating means 8 each comprise two limb sections and a base section; preferably, the first and second insulating means (3, 8) are embodied in each case in U-shaped fashion. The housing 16 is arranged in each case between the two limb sections of each first and second insulating means (3, 8). The limb sections of the first and second insulating means (3, 8) respectively overlap in this case.

A first, in particular largest, side face of the housing 16 is covered by means of a respective limb section of the first insulating means 3 and the second insulating means 8, in particular completely covered in each case. Preferably, a respective limb section of the first insulating means 3 completely covers a respective limb section of the second insulating means 8.

A limb section of the first insulating means 3 and a limb section of the second insulating means 8 are covered by means of the third insulating means 5.

A further limb section of the first insulating means 3 and a further limb section of the second insulating means 8 are covered by means of the fourth insulating means 10.

The third insulating means 5 and the fourth insulating means 10 are embodied in each case in plate-shaped and/or planar fashion.

The first and/or second and/or third and/or fourth insulating means (3, 8, 5, 10) are embodied as molded parts and/or from film, in particular from plastic.

The sixth insulating means 9 is arranged at the third side face of the housing 16. For this purpose, the sixth insulating means 9 comprises a cutout having the shape of an outer shape of the cell terminal 7, of the cell controller 31 and of the discharge device 15.

In the stacking direction 17, the insulating systems of an electrical energy storage cell 2 and of a further electrical energy storage cell 2 of the electrical energy store 1 are arranged in the following stacking sequence:
- third insulating means 5 of the electrical energy storage cell 2,
- first insulating means 3 of the electrical energy storage cell 2,
- second insulating means 8 of the electrical energy storage cell 2,
- housing 16 of the electrical energy storage cell 2,
- second insulating means 8 of the electrical energy storage cell 2,
- first insulating means 3 of the electrical energy storage cell 2,
- fourth insulating means 10 of the electrical energy storage cell 2,
- third insulating means 5 of the further electrical energy storage cell 2,
- first insulating means 3 of the further electrical energy storage cell 2,
- second insulating means 8 of the further electrical energy storage cell 2,
- housing 16 of the further electrical energy storage cell 2,
- second insulating means 8 of the further electrical energy storage cell 2,
- first insulating means 3 of the further electrical energy storage cell 2, and
- fourth insulating means 10 of the further electrical energy storage cell 2.

Here the order of the first and second insulating means (3, 8) is interchangeable in each case.

Instead of the fourth insulating means 10 of the electrical energy storage cell 2 and the third insulating means 5 of the further electrical energy storage cell 2, a single insulating means is arrangeable between the first insulating means 3 of the electrical energy storage cell 2 and the first insulating means 3 of the further electrical energy storage cell 2.

The housing 16 comprises the safety valve. The safety valve is arranged at a second side face of the housing 16, said second side face being situated opposite relative to, in particular, the cell terminal 7, the cell controller 31 and the discharge device 15. The safety valve is at least partly covered by the fifth insulating means 4. Preferably, the fifth insulating means 4 has cutouts in the region of the safety valve. The fifth insulating means 4 is thus arranged on an opposite side face of the housing 16 relative to the sixth insulating means 9.

The fifth and sixth insulating means (4, 9) are embodied as molded parts, in particular as plastic molded parts.

Preferably, the insulating means (3, 8, 5, 10, 4, 9) are adhesively bonded to the electrical energy storage cell 2, in particular wherein the insulating means (3, 8, 5, 10, 4, 9) each comprise an adhesive. Preferably, the first and/or second and/or third and/or fourth insulating means (3, 8, 5, 10) are/is embodied as an adhesive film.

Figure 2:
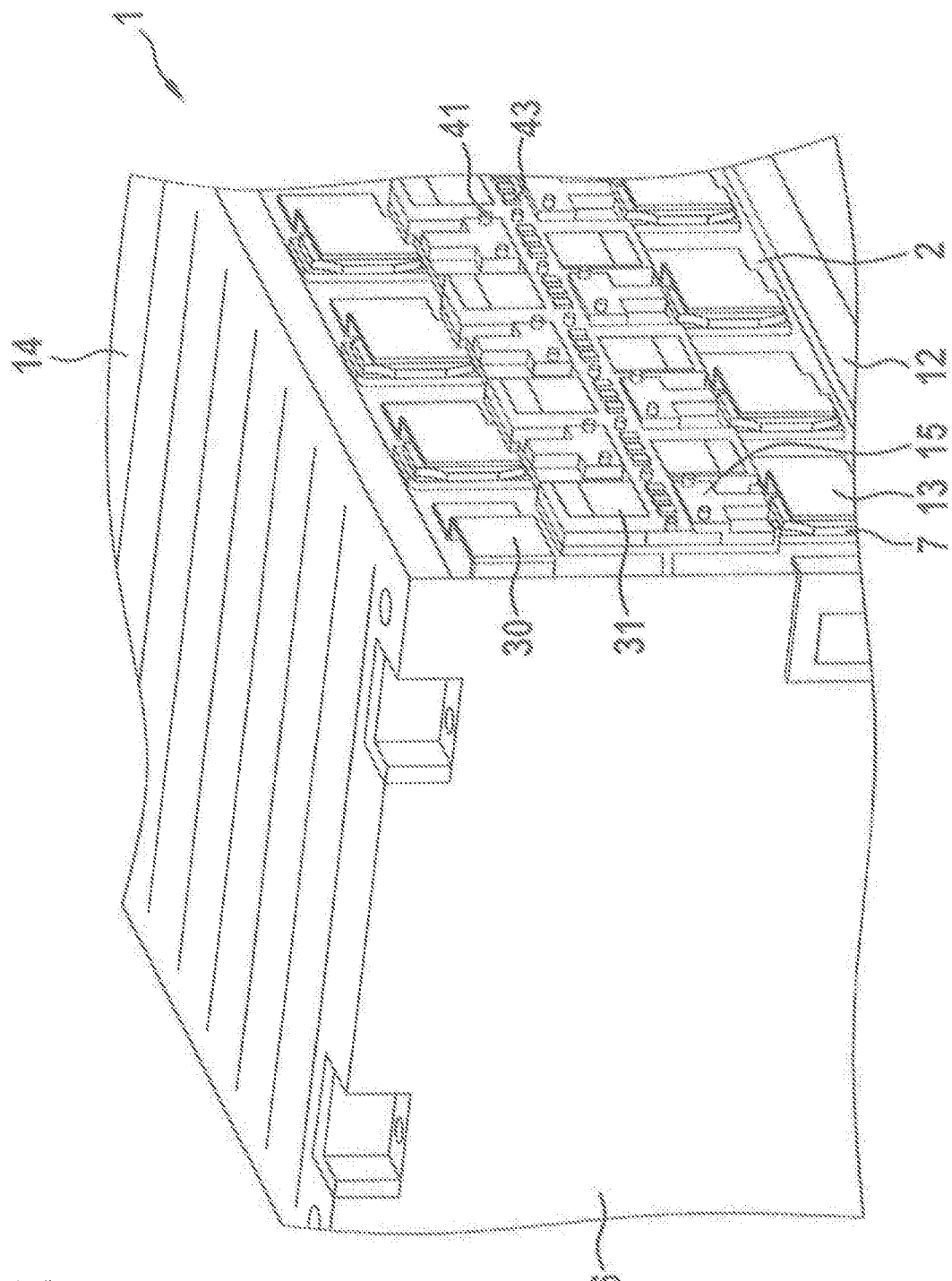
FIG. 2 shows a perspective side view of the electrical energy store 1 according to the invention as illustrated in FIG. 1.

FIG. 2 illustrates the electrical energy store 1 in a side view.

The cell connectors 13 in each case connect a cell terminal 7 of an electrical energy storage cell 2 to a housing 16 of an adjacent electrical energy storage cell 2. Preferably, the electrical energy storage cells 2 are arranged in a manner connected in series by means of the cell connectors 13.

In this case, the cell terminal 7 is a first electrical terminal of an electrical energy storage cell 2 and the housing 16 functions as a second electrical terminal of the electrical energy storage cell 2. The respective cell terminal 7 is arranged in a manner electrically insulated from the respective housing 16 of the respective electrical energy storage cell 2.

The housing 16 of an outer electrical energy storage cell 2 in the stacking direction 17 is electrically conductively connected to a connection means 30 for the electrically conductive connection of the electrical energy storage cells 2 to a connecting means 40 of the electrical energy store 1. The connection means 30 is embodied here as a sheet-metal part, in particular as a stamped and bent part. By way of example, the connecting means 40 is embodied as a screw part, in particular as a screw.

The discharge device 15 is connected to the cell controller 31; the cell controller 31 comprises a discharge controller for controlling the discharge device 15. Alternatively or additionally, the cell controller 31 is connected to at least one sensor for determining an operating parameter of the electrical energy storage cell 2, in particular wherein the cell controller 31 is configured for determining an operating state of the electrical energy storage cell 2.

The cell controller 31 is embodied as an integrated circuit for example on a printed circuit board part.

Each electrical energy storage cell 2 comprises a separate discharge device 15 and a separate cell controller 31.

By means of the discharge device 15, the respective electrical energy storage cell 2 can be discharged in a controlled manner. For this purpose, the discharge device 15 is electrically conductively connected in each case to the cell terminal 7 and the housing 16 of the respective electrical energy storage cell 2.

The electrical energy storage cell 2, in particular the discharge device 15, comprises projections 41 for connecting the electrical energy storage cell 2 to the control unit 11. The respective projection 41 projects from the electrical energy storage cell 2, in particular from the discharge device 15, and is embodied as a pin, for example.

The electrical energy storage cells 2 are arranged in the electrical energy store 1 in such a way that all the projections 41 are arranged in alignment.

The cell controller 31 comprises at least one contact pad 43 arranged on the printed circuit board part. By means of the contact pad 43, the cell controller 31 is connectable to the control unit 11 in a signal-conducting manner.

Figure 3:
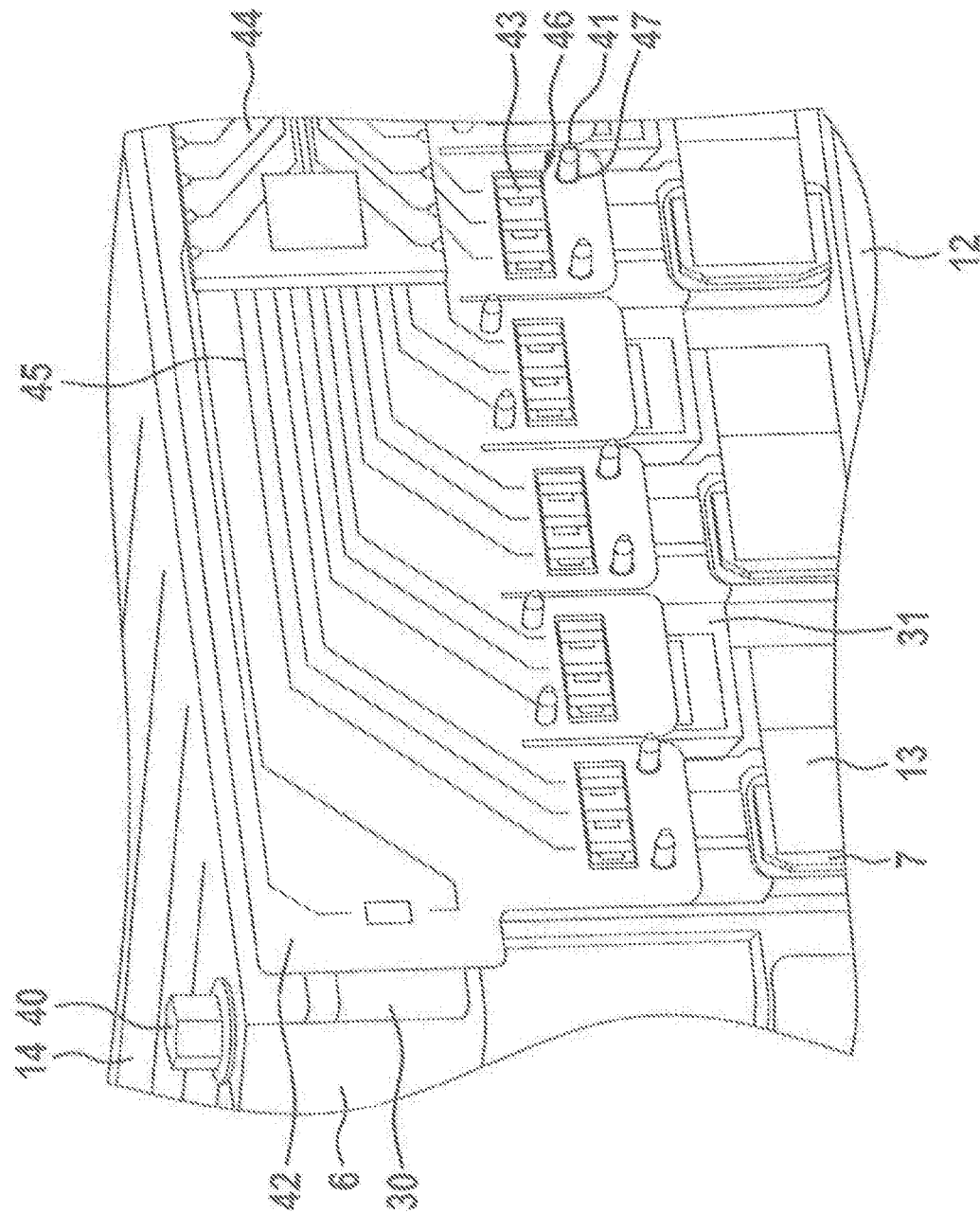
FIG. 3 shows a detail view of the electrical energy store 1 according to the invention as illustrated in FIG. 1.

FIG. 3 illustrates the electrical energy store 1 comprising the control unit 11. In this case, the housing part 22 of the control unit 11 has been omitted, such that a printed circuit board 42, on which a controller circuit 44, in particular a microcontroller, is arranged, is visible. Preferably, the printed circuit board 42 is embodied as a flexible printed circuit board.

The printed circuit board 42 comprises conductor tracks 45 for the electrically conductive connection of the controller circuit 44 to the cell controller 31. The printed circuit board 42 comprises first cutouts 46 and second cutouts 47 spaced apart from one another in each case.

By means of the second cutouts 47, the printed circuit board 42 is alignable relative to the electrical energy storage cells 2, in particular relative to the discharge devices 15 and/or the cell controllers 31. For this purpose, a respective projection 41 is led at least partly through a respective second cutout 47.

By means of the respective first cutout 46, a respective conductor track 45 is connectable to a respective contact pad 43 of a respective cell controller 31, in particular connectable by means of laser welding.

The housing part 22 of the control unit 11 comprises third cutouts 21 spaced apart from one another. By means of the third cutouts 21, the respective conductor tracks 45 are connected to the respective contact pad 43 when the housing part 22 is mounted on the control unit 11. Preferably, for this purpose, the third cutouts 21 are covered with a laser-transparent material, in particular a laser-transparent film. The third cutouts 21 are arranged in alignment.

Figure 4:
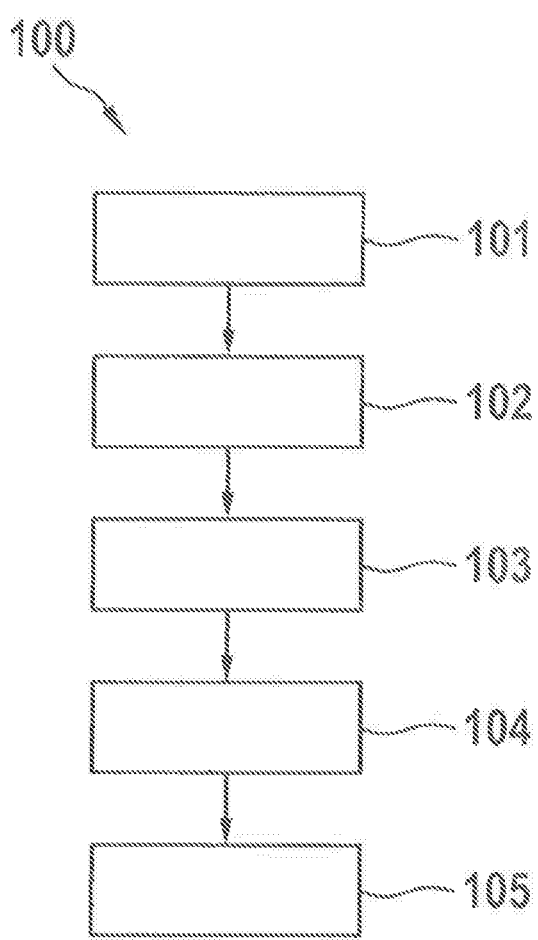
FIG. 4 shows a flow diagram of the method according to the invention for producing an electrical energy store 1.

FIG. 4 illustrates a flow diagram of the method 100 according to the invention for producing an electrical energy store 1.

The method 100 comprises the following temporally successive method steps:

In a first method step 101 the electrical energy storage cells 2 are arranged alongside one another, wherein the positive and negative electrical terminals of the respective energy storage cells 2 are arranged alternately. In this case, the electrical energy storage cells 2 are aligned in such a way that all the projections 41 are oriented in alignment.

In a second method step 102 the electrical energy storage cells 2 are connected, in particular fixed, to one another by means of the cover part 14 and the holding means 12.

In a third method step 103 the cell connectors 13 are arranged on the electrical energy storage cells 2 and are connected to the cell terminals 7.

In a fourth method step 104 the control unit 11 is aligned relative to the electrical energy storage cells 2 and is connected to the electrical energy store 1.

In a fifth method step 105 the controller circuit 44 of the control unit 11 is connected to the cell controllers 31 in a signal-conducting and/or electrically conducting manner, in particular by means of laser welding.

In this case, an electrical energy store is understood to mean a rechargeable energy store, in particular comprising an electrochemical energy storage cell and/or an energy storage module comprising at least one electrochemical energy storage cell and/or an energy storage pack comprising at least one energy storage module. The energy storage cell is implementable as a lithium-based battery cell, in particular lithium-ion battery cell. Alternatively, the energy storage cell is embodied as a lithium-polymer battery cell or a nickel-metal hydride battery cell or a lead-acid battery cell or a lithium-air battery cell or a lithium-sulfur battery cell.

The invention claimed is:

1. An electrical energy store (1) comprising a control unit (11) and a plurality of electrical energy storage cells (2) comprising respective cell controllers (31), characterized in that the control unit (11) comprises a printed circuit board (42) connected to the cell controllers, wherein the cell controllers (31) have respective contact pads (43), wherein the printed circuit board (42) comprises first cutouts (46) and conductor tracks (45), wherein each of the conductor tracks (45) is connected to a respective one of the contact pads (43) through a respective one of the first cutouts (46) such that the cell controllers (31) are connected to the control unit (11) in a signal-conducting and/or electrically conducting manner via the respective contact pads (43), characterized in that the control unit (11) comprises a housing part (22), wherein the housing part (22) comprises third cutouts (21), and wherein the third cutouts (21) respectively cover the first cutouts (46).

2. The electrical energy store (1) according to claim 1, characterized in that the printed circuit board (42) comprises a controller circuit (44), which is connected to the cell controllers (31) by the conductor tracks (45) and the contact pads (43).

3. An electrical energy store (1) according to claim 1, characterized in that the printed circuit board (42) is connected to each of the electrical energy storage cells (2) in a positively locking manner.

4. An electrical energy store (1) according to claim 3, characterized in that each of the electrical energy storage cells (2) comprises at least one projection (41), which is led in each case through a respective second cutout (47) in the printed circuit board (42).

5. An electrical energy store (1) according to claim 4, characterized in that the projections (41) of the electrical energy storage cells (2) are arranged in alignment, and wherein the second cutouts (47) in the printed circuit board (42) are arranged in alignment.

6. An electrical energy store (1) according to claim 1, characterized in that each of the electrical energy storage cells (2) comprises a discharge device (15), which is configured to be driven by the respective cell controller (31).

7. A vehicle comprising at least one electrical energy store (1) according to claim 1.

8. A method (100) for producing an electrical energy store (1) according to claim 1, comprising the following temporally successive method steps:
   wherein in a first method step (101) electrical energy storage cells (2) of the electrical energy store (1) are arranged alongside one another,
   wherein in a second method step (102) the electrical energy storage cells (2) are fixed to one another,
   wherein in a third method step (103) cell connectors (13) are arranged on the electrical energy storage cells (2) and are connected to cell terminals (7) of the electrical energy storage cells (2),
   wherein in a fourth method step (104) a control unit (11) is aligned relative to the electrical energy storage cells (2) and is connected to the electrical energy store (1), and
   wherein in a fifth method step (105) a controller circuit (44) of the control unit (11) is connected to the cell controllers (31) in a signal-conducting and/or electrically conducting manner by laser welding.

9. The method according to claim 8, characterized in that in the first method step (101) the electrical energy storage cells (2) are arranged in such a way that the positive and negative electrical terminals of the respective energy storage cells (2) are arranged alternately.

10. The method according to claim 9, wherein the electrical energy storage cells (2) are aligned in such a way that projections (41) on the electrical energy storage cells (2) are oriented in alignment.

11. The electrical energy store (1) according to claim 1, wherein each of the conductor tracks (45) is connected by welding to the respective one of the contact pads (43) through the respective one of the first cutouts (46).

12. The electrical energy store (1) according to claim 1, wherein each of the conductor tracks (45) is connected by laser welding to the respective one of the contact pads (43) through the respective one of the first cutouts (46).

13. The electrical energy store (1) according to claim 1, wherein the third cutouts (21) are closed by a transparent film.

14. The electrical energy store (1) according to claim 1, wherein the third cutouts (21) are closed by a laser-transparent film.

15. An electrical energy store (1) according to claim 3, characterized in that each of the electrical energy storage cells (2) comprises at least one projection (41), which is led in each case through a respective second cutout (47) in the printed circuit board (42), wherein the printed circuit board (42) is alignable by the projections (41) and the second cutouts (47).

* * * * *